Oct. 14, 1958    A. RUTISHAUSER    2,855,785
COUPLING
Filed Sept. 13, 1955

*INVENTOR*
ALBERT RUTISHAUSER
BY
*ATTORNEY*

United States Patent Office 2,855,785
Patented Oct. 14, 1958

2,855,785

COUPLING

Albert Rutishauser, Zurich, Switzerland, assignor to Paul Baumer, Frauenfeld, Switzerland, a Swiss firm Application September 13, 1955, Serial No. 534,033

Claims priority, application Switzerland September 15, 1954

3 Claims. (Cl. 74—125.5)

This invention relates generally to couplings.

An object of the invention is to provide a coupling of relatively simple construction that is operative to intermittently transmit movement from a driving member to a driven member.

In accordance with an aspect of this invention, a coupling comprises a rotatable casing defining a raceway having an outer peripheral wall and adapted for connection to one of the parts to be coupled together, a rotatable member coaxial with the casing and adapted for connection to the other of the two parts to be coupled together, a set of rolling members loosely fitting into the raceway, a carrier arm extending radially from the rotatable member and fixed to rotate with the latter, a wedge member turnably mounted in the carrier arm and extending into the raceway between two adjacent rolling members, the wedge member being turnable relative to the carrier arm between an engaged position, wherein the wedge member urges apart the two adjacent rolling members to strongly press the set of rolling members against the outer peripheral wall of the raceway for rotation with the casing about the axis of the latter, and a disengaged position, wherein the two rolling members adjacent the wedge member are freed for movement toward each other to permit rotation of the set of rolling members independent of the casing, plates fixed to the wedge member and turnable with the latter relative to the carrier arm, the plates having portions projecting radially with respect to the axis of the rotatable member, at least one stationary stop member engageable with the radially projecting portions of the plates as the latter rotate with the wedge member, carrier arm and rotatable member about the axis of the latter and operative to turn the plates relative to the carrier arm for disposing the latter in one of the engaged and disengaged positions, and means for disposing the wedge member in the other of such positions.

The above, and objects, features and advantages of the invention, will be apparent in the following detailed description of an illustrative embodiment thereof which is to be read in connection with the accompanying drawing forming a part hereof, and wherein.

Figure 1:
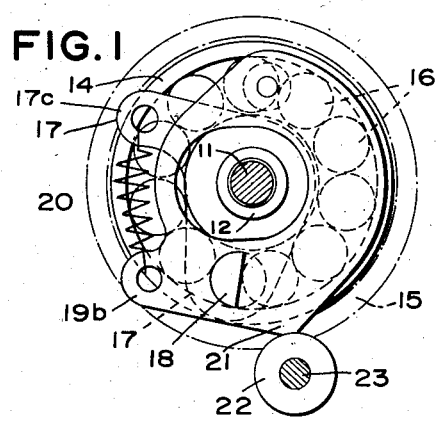
Fig. 1 is an end elevational view of a coupling embodying the invention, which is shown in its disengaged condition.
Figure 3:
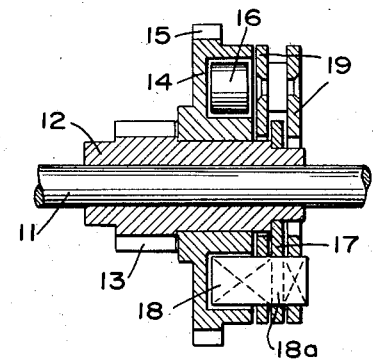
Fig. 3 is an axial sectional view of the coupling of Figs. 1 and 2.
Figure 2:
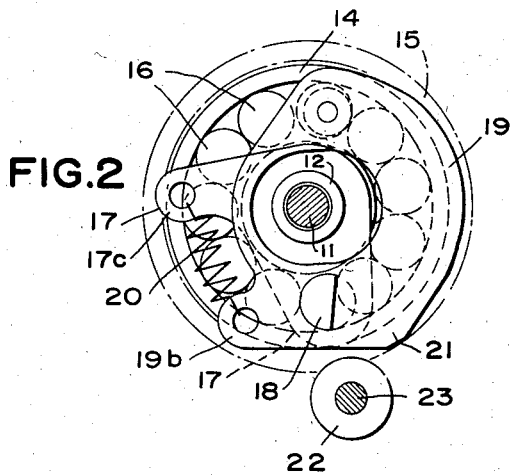
Fig. 2 is a view similar to that of Fig. 1, but showing the coupling in its engaged condition.
Figure 4:
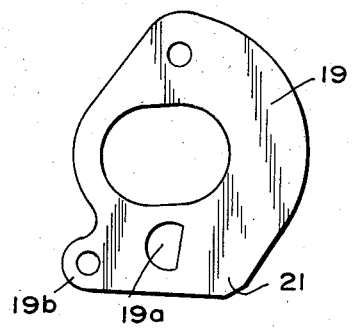
Fig. 4 is an elevational view of a part included in the coopling of Figs. 1, 2 and 3.
Figure 5:
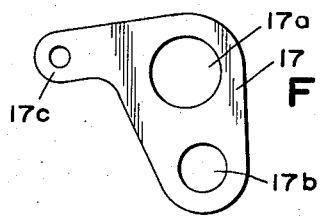
Fig. 5 is an elevational view of another part included in the coupling of Figs. 1, 2 and 3.

Referring to the drawing in detail, it will be seen that a coupling embodying this invention includes a bushing 12 with a toothed rim 13 (Fig. 3) rotatably carried on a stationary shaft 11. On the bushing 12, a part 14 with a toothed rim 15 is rotatably mounted and has an annular grove defining a raceway which contains a set of rollers 16. A radial carrier arm 17 is rigidly mounted on the bushing 12 at an opening 17a (Fig. 5) in the carrier arm and the latter has a circular opening 17b spaced radially from the opening 17a, that is, from the axis of the bushing 12, and rotatably receiving a circular portion 18a (Fig. 3) of a wedge member 18. The end portions of wedge member 18 at opposite sides of the circular portion 18a are of non-circular cross-section, for example, a cross-section defined by an arc and a chord, as shown in Figs. 1 and 2, and one non-circular end portion of wdege member 18 extends into the groove of part 14 in between two adjacent rollers of the set of rollers 16. Two identical plates 19 are fixedly attached to the non-circular portions of wedge member 18 at opposite sides of arm 17, so that the turnable wedge member 18 forms a pivot for the plates 19 about which the latter can be angularly displaced relative to the carrier arm 17. As seen in Fig. 4, each plate 19 has a non-circular opening 19a corresponding in cross-section to the cross-sectional shape of the non-circular portions of the wedge member 18 and receiving such non-circular portions of the latter so that, as mentioned above, the plates 19 and wedge member 18 turn as a unit about the axis of the wedge member relative to the carrier arm 17 which rotatably supports the wedge member. Each plate 19 has an apertured lug 19b extending therefrom and spaced from the opening 19a, while the carrier arm 17 has an apertured extension 17c which is spaced radially from the opening 17a. A tension spring 20 is connected, at one end, to the extension 17a, and at its other end, to the lugs 19b of the plates 19 and is effective to urge the plates 19 and the wedge member 18 to turn about the axis of the latter relative to the arm 17 in the clockwise direction, as viewed in Figs. 1 and 2, thereby to maintain the plates 19 and the carrier arm 17 in the relative positions shown in Fig. 2, in which the wedge member 18 forces the rollers 16 apart in the peripheral direction of the set of rollers. Thereby the rollers 16 are pressed against the inner side of the outer peripheral wall of the part 14 to rotate with the latter about the axis of shaft 11 and to correspondingly drive, or be driven by, the wdege member 18, so that the part 14 becomes coupled through the carrier arm 17 to the bushing 12. Each plate 19 is further formed with a portion 21 which is spaced radially from the related opening 19a receiving the wedge member 18 and which projects radially with respect to the axis of rotation of the bushing 12 in response to turning of plates 19 and the wedge member relative to arm 17 by the action of spring 20.

A roller 22 is fitted on a stationary shaft 23 in the path of the radially projecting portions 21 of the plates 19 and, as the latter rotate with the bushing 12, the portions 21 strike against the roller 22 during each revolution, whereby the plates 19 are then rocked by the roller 22 in the counterclockwise direction, as viewed in Figs. 1 and 2, about the axis of wedge member 18 relative to the arm 17, so that the wedge member 18 is turned relative to the arm 17 to the position shown in Fig. 1, wherein the rollers 16 are loose, so that the parts 12 and 14 are no longer coupled to each other. Instead of only one roller 22, several such rollers could be provided, distributed along a circle concentric with the shaft 11, so that, during each revolution of the bushing 12, the coupling between the shaft 11 and the bushing 12 will be disengaged a corresponding number of times.

It will be apparent that the above described coupling is normally engaged, as in Fig. 2, and is disengaged only during the periods of time when the projecting portions 21 of plates 19 are engaged by a roller 22.

Although a particular embodiment of the invention has been described in detail herein with reference to the accompanying drawing, it is to be understood that the inven-

What is claimed is:

1. In a device for rotatably coupling together two parts, the combination of a rotatable casing defining a raceway having an outer peripheral wall and adapted for connection to one of the parts to be coupled together, a rotatable member coaxial with said casing and adapted for connection to the other of the two parts to be coupled together, a set of rolling members loosely fitting into said raceway, a carrier arm extending radially from said member and fixed to the latter, a wedge member turnably mounted in said carrier arm and extending into said raceway between two adjacent rolling members of said set, said wedge member being turnable relative to said carrier arm between engaged and disengaged positions, in which said two adjacent rolling members are urged apart sufficiently in the circumferential direction of said casing to strongly press said set of rolling members against said outer peripheral wall of the raceway for rotation with said casing about the axis of the latter, and in which said two adjacent rolling members are freed for movement toward each other to permit rotation of said set of rolling members independent of said casing, respectively, plates fixed to said wedge member and turnable with the latter relative to said carrier arm, said plates having portions projecting radially with respect to the axis of said rotatable member, at least one stationary stop member engageable with said radially projecting portions of the plates as the latter rotate with said wedge member, carrier arm and rotatable member about the axis of the latter and operative to turn said plates relative to said carrier arm for disposing said wedge member in one of said positions, and means for disposing said wedge member in the other of said positions.

2. In a device for rotatably coupling together two parts, the combination as in claim 1; wherein said stationary stop member turns said plates for disposing said wedge member in said disengaged position of the latter, and said means for disposing the wedge member in said other position includes a spring connected between said carrier arm and said plates and yieldably urging the latter to turn relative to said carrier arm to a position corresponding to said engaged position of the wedge member.

3. In a device for rotatably coupling together two parts, the combination as in claim 2; wherein said rotatable member is a bushing and said casing is rotatably mounted on said bushing, said casing and bushing having toothed outer peripheries for connection to the respective parts to be coupled together.

References Cited in the file of this patent

UNITED STATES PATENTS

| 1,076,030 | Ford | Oct. 21, 1913 |

FOREIGN PATENTS

| 88,935 | Switzerland | Apr. 1, 1921 |
| 147,245 | Sweden | Oct. 12, 1954 |